Aug. 22, 1939. G. F. FORSTHOEFEL Re. 21,178

REFRIGERATION APPARATUS

Original Filed Feb. 23, 1934 2 Sheets-Sheet 1

WITNESSES:
W. M. Van Heiner
E. H. Lutz.

INVENTOR
GREGG F. FORSTHOEFEL.
BY M. Steiger
ATTORNEY

Aug. 22, 1939. G. F. FORSTHOEFEL Re. 21,178

REFRIGERATION APPARATUS

Original Filed Feb. 23, 1934 2 Sheets-Sheet 2

WITNESSES:
W. M. Van Sciver
E. H. Lutz.

INVENTOR
GREGG F. FORSTHOEFEL.
BY M. Steiger
ATTORNEY

Reissued Aug. 22, 1939 Re. 21,178

UNITED STATES PATENT OFFICE 21,178

REFRIGERATION APPARATUS

Gregg F. Forsthoefel, Adrian, Mich., assignor to Westinghouse Electric & Manufacturing Company, East Pittsburgh, Pa., a corporation of Pennsylvania Original No. 2,072,446, dated March 2, 1937, Serial No. 712,490, February 23, 1934. Application for reissue February 14, 1939, Serial No. 256,321

4 Claims. (Cl. 62—89)

My invention relates to refrigeration apparatus and has for an object the provision of a storage space in a refrigerator cabinet in which the circulation of air is retarded.

It is another object of my invention to provide a storage place for vegetables and other foods, from which it is desirable to prevent the absorption of moisture, and which storage place is made an integral part of the refrigerator food storage compartment.

It is yet another object of my invention to provide a built-in vegetable or crisping pan or pans which are so arranged that one of the shelves of the refrigerator food storage compartment forms at least a partial closure for the pan or pans.

It is a further object of my invention to so arrange and construct the aforementioned shelf that it provides a separate crisping compartment in the food storage compartment and which shelf reduces materially the circulation of refrigerated air in the crisping compartment.

These and other objects are effected by my invention, as will be apparent from the following description and claims taken in connection with the accompanying drawings, forming a part of this application, in which:

Figure 1:
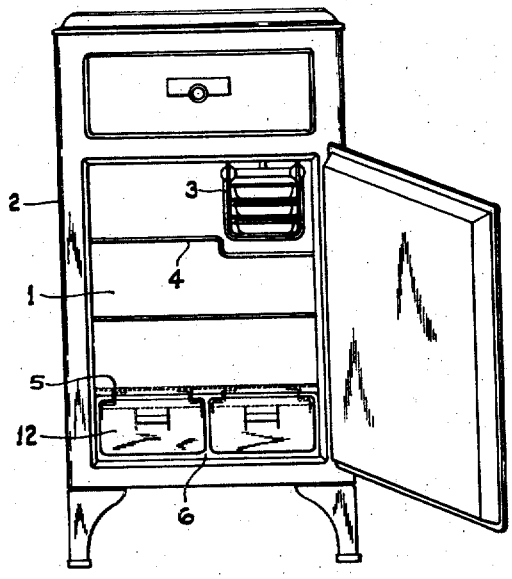
Fig. 1 is a front view of a refrigerator cabinet in which a preferred embodiment of my invention is illustrated.

Referring specifically to the drawings for a detailed description of my invention, numeral 1 designates a food storage compartment of a refrigerator cabinet 2. A cooling unit 3, for freezing ice cubes and for refrigerating and circulating cold air in the food storage compartment, is disposed in the food storage compartment 1. Wire shelves 4 are disposed in the food storage compartment to receive articles of food to be stored.

Figure 2:
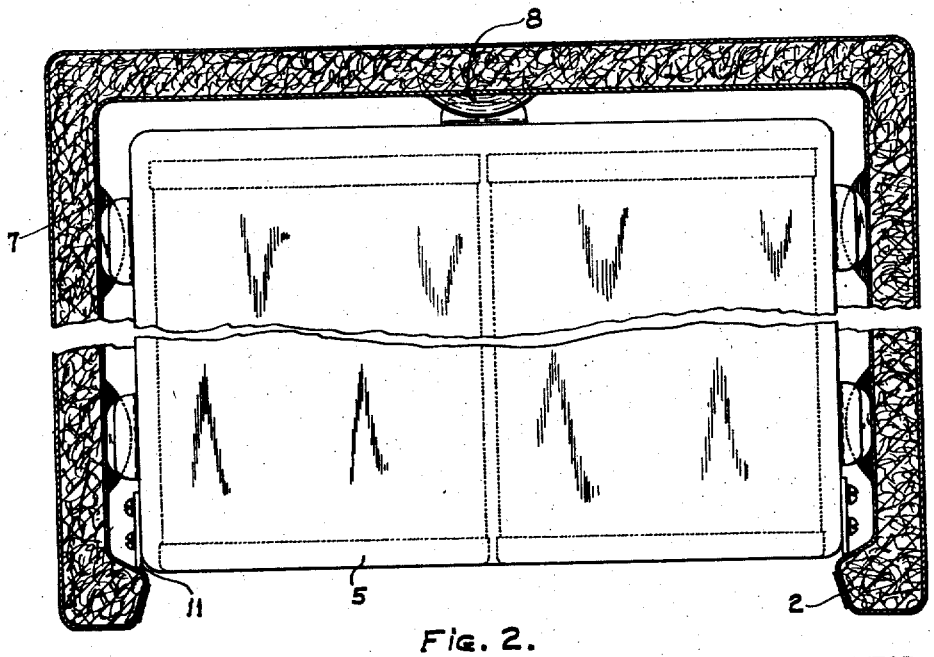
Fig. 2 is a sectional view of the refrigerator cabinet shown in Fig. 1 showing the shelf from which a plurality of crisping pans are suspended and showing the crisping pans in outline.
Figure 3:
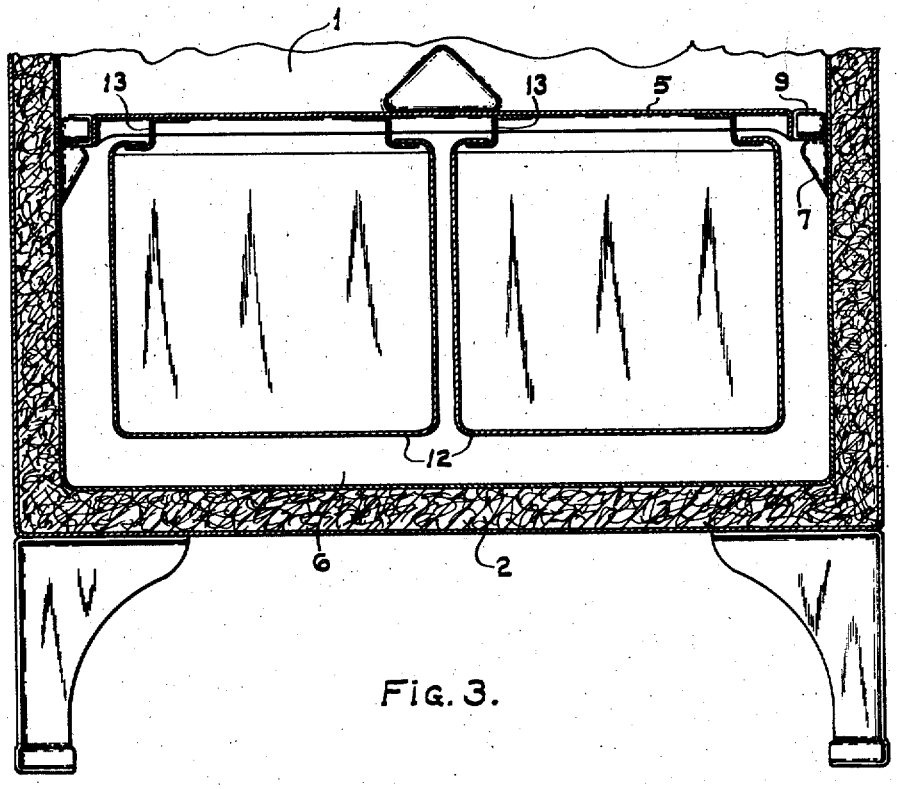
Fig. 3 is a partial sectional view of the refrigerator cabinet and of the shelf shown in Fig. 2 and illustrates the supporting means for the shelf and crisping pans.

A substantially imperforate shelf 5 is supported in the food storage compartment near the bottom thereof and is spaced from the walls of the food storage compartment as clearly shown in Fig. 2, thus forming a crisping compartment 6. As will be apparent, the circulation of air in the main food storage compartment is quite rapid, while the circulation in the crisping compartment 6 is much slower because of the restricted area for air circulation past the imperforate shelf 5.

Figure 4:
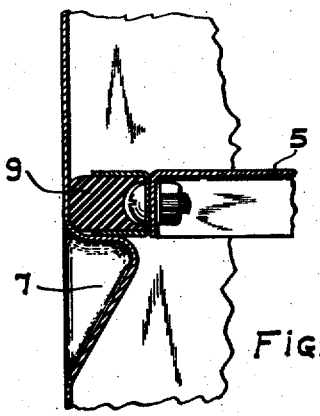
Fig. 4 is an enlarged view of the side shelf support shown in Fig. 3.
Figure 5:
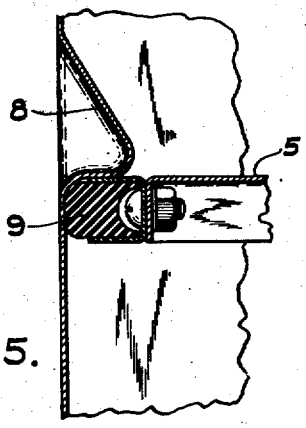
Fig. 5 is an enlarged sectional view of the back shelf support.

The shelf 5 is supported by side projections 7 and a back projection 8, the back projection being positioned above the side projections. Rubber buffers 9 are attached to the shelf 5, as clearly shown in Figs. 4 and 5, the side buffers being supported by the projections 7, (Fig. 4), while the back buffer is slid under the back projection 8 (Fig. 5). The shelf 5 is, therefore, prevented from tilting. Suitable stops 11 are attached to the front of the shelf 5. The shelf 5 may be removed from the food storage compartment 2 by lifting the front of the shelf a sufficient distance to move the shelf forwardly to disengage the back buffer before the stops 11 prevent further forward movement, and then cocking the shelf 5 to remove it from the food storage compartment.

Preferably, two vegetable or crisping pans 12 are slidably supported by the shelf 5 in the crisping compartment 6 by suitable Z-shaped supports 13. The tops of the pan 12 are relatively close to the imperforate shelf 5 so that the shelf provides a closure member for the crisping pans 12.

It is well known that certain articles of food which contain a large amount of moisture spoil in mechanical refrigerators due to dehydration, and crisping pans detachably mounted in refrigerator cabinets have, therefore, been used. However, the provision of crisping pans in a separate storage space, made an integral part of the food storage compartment, and having a cover which reduces air circulation and also acts as a shelf is attained by my construction and arrangement.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In refrigerating apparatus, the combination of a food storage compartment, a cooling element for abstracting heat from the food storage compartment, a shelf in said food storage compartment for supporting articles to be cooled, at least a portion of said shelf being substantially imperforate, a crisping pan disposed below said shelf, means for slidably supporting said crisping pan from said shelf, and said imperforate shelf portion covering said crisping pan to form therewith a closed receptacle in which the circulation of air is restricted and dehydration of the foodstuffs therein reduced.

2. In refrigerating apparatus, the combination of a food storage compartment, a cooling element in the food storage compartment over which air to be cooled circulates, a substantially imperforate shelf spaced from the bottom of the food storage compartment and providing a subcompartment formed by the bottom of the food storage compartment, the imperforate shelf, and lower portions of the side walls of the food storage compartment, a crisping pan disposed in said sub-compartment, and means for slidably supporting said crisping pan from said imperforate shelf, said imperforate shelf covering said crisping pan when in its position within the storage compartment to provide a closed chamber for restricting the circulation of air therein, whereby dehydration of foodstuffs in the chamber is reduced.

3. In refrigerating apparatus, the combination of a food storage compartment, a cooling element for abstracting heat from the food storage compartment, a readily removable shelf in said food storage compartment formed separately therefrom for supporting articles to be cooled, at least a portion of said shelf being substantially imperforate, a crisping pan disposed beneath said shelf, means for slidably supporting said crisping pan below said shelf, and said imperforate shelf portion covering said crisping pan to form therewith a closed receptacle in which the circulation of air is restricted and dehydration of the foodstuffs therein reduced.

4. In refrigerating apparatus, the combination of a food storage compartment, a cooling element in the food storage compartment over which air to be cooled circulates, a substantially imperforate readily removable shelf spaced from the bottom of the food storage compartment, formed separately therefrom and providing a subcompartment enclosed by the bottom of the food storage compartment, the imperforate shelf, and lower portions of the side walls of the food storage compartment, crisping pan means occupying substantially the entire space in said sub-compartment, and means for slidably supporting said crisping pan means below said imperforate shelf, said imperforate shelf covering said crisping pan when in its position within the storage compartment to provide a closed chamber for restricting the circulation of air therein, whereby dehydration of foodstuffs in the chamber is reduced.

GREGG F. FORSTHOEFEL.